(12) United States Patent
Chu

(10) Patent No.: US 6,703,745 B2
(45) Date of Patent: Mar. 9, 2004

(54) ROTOR STRUCTURE FOR A MOTOR HAVING BUILT-IN TYPE PERMANENT MAGNET

(75) Inventor: Ming Tsung Chu, Taichung (TW)

(73) Assignee: Adlee Powertronic Co, Ltd., Taichung (TW)

( * ) Notice: Subject to any disclaimer, the term of this patent is extended or adjusted under 35 U.S.C. 154(b) by 0 days.

(21) Appl. No.: 10/158,841

(22) Filed: Jun. 3, 2002

(65) Prior Publication Data

US 2003/0048024 A1 Mar. 13, 2003

(30) Foreign Application Priority Data

Sep. 10, 2001 (TW) ........................ 90215669 U (51) Int. Cl.[7] ................ H02K 21/12; H02K 23/00; H02K 1/22
(52) U.S. Cl. ................ 310/156.45; 310/216; 310/177; 310/156.38; 310/156.53
(58) Field of Search ................ 310/216, 177, 310/156.01–156.84

(56) References Cited

U.S. PATENT DOCUMENTS

| | | | |
|---|---|---|---|
| 4,472,651 A | | 9/1984 | Jones |
| 4,713,569 A | | 12/1987 | Schwartz |
| 5,861,693 A | * | 1/1999 | Takahashi ............ 310/113 |
| 6,008,559 A | | 12/1999 | Asano et al. |
| 6,034,458 A | | 3/2000 | Uetake et al. |
| 6,204,584 B1 | | 3/2001 | Muszynski |

FOREIGN PATENT DOCUMENTS

| | | | | |
|---|---|---|---|---|
| JP | 62213538 A | * | 9/1987 | ........ H02K/21/08 |
| JP | 03117338 A | * | 5/1991 | ........ H02K/1/27 |
| JP | 07236240 A | * | 9/1995 | ........ H02K/1/27 |
| JP | 07264785 A | * | 10/1995 | ........ H02K/1/27 |
| JP | 08033246 A | * | 2/1996 | ........ H02K/1/27 |
| JP | 10004643 A | * | 1/1998 | ........ H02K/1/27 |
| JP | 10136595 A | * | 5/1998 | ........ H02K/1/27 |
| JP | 10285849 A | * | 10/1998 | ........ H02K/1/27 |
| JP | 11089140 A | * | 3/1999 | ........ H02K/1/27 |
| JP | 2000350393 A | * | 12/2000 | ........ H02K/1/27 |
| JP | 2002112479 A | * | 4/2002 | ........ H02K/1/27 |

* cited by examiner

Primary Examiner—Burton S. Mullins
Assistant Examiner—J. Aguirrechea
(74) Attorney, Agent, or Firm—Rabin & Berdo, P.C.

(57) ABSTRACT

A rotor structure for a motor having built-in type permanent magnets includes a multiplicity of axial slots for containing the permanent magnet, and a shaft hole for installing a shaft. The invention essentially forms a petal-shaped convex polar portion having an exterior circular arc on the outer side of the rotor adjacent each axial magnet slot, where the radius of the circular arc is smaller than the radius of the rotor. The petal-shaped convex polar portions provide an approximately sinusoidal distribution of air-gap magnetic flux that can improve the cogging torque of the motor, weaken the armature reaction of the motor, and prevent the permanent magnets from being demagnetized. In addition, an axial empty slot is also provided between the shaft hole and the corners where the adjacent magnet slots approach such that the magnetic flux leakage can be prevented and the weight of the rotor can be reduced too.

10 Claims, 7 Drawing Sheets

ROTOR STRUCTURE FOR A MOTOR HAVING BUILT-IN TYPE PERMANENT MAGNET

FIELD OF THE INVENTION

The invention relates to a rotor structure for a motor having a built-in type permanent magnet, and more particularly, to a rotor structure for a motor having a built-in type permanent magnet that possesses an approximately-sinusoidal distribution of magnetic flux in the air-gap which results in a significant reduction in both the cogging torque and the rotational vibration of motor.

BACKGROUND OF THE INVENTION

Figure 5A:
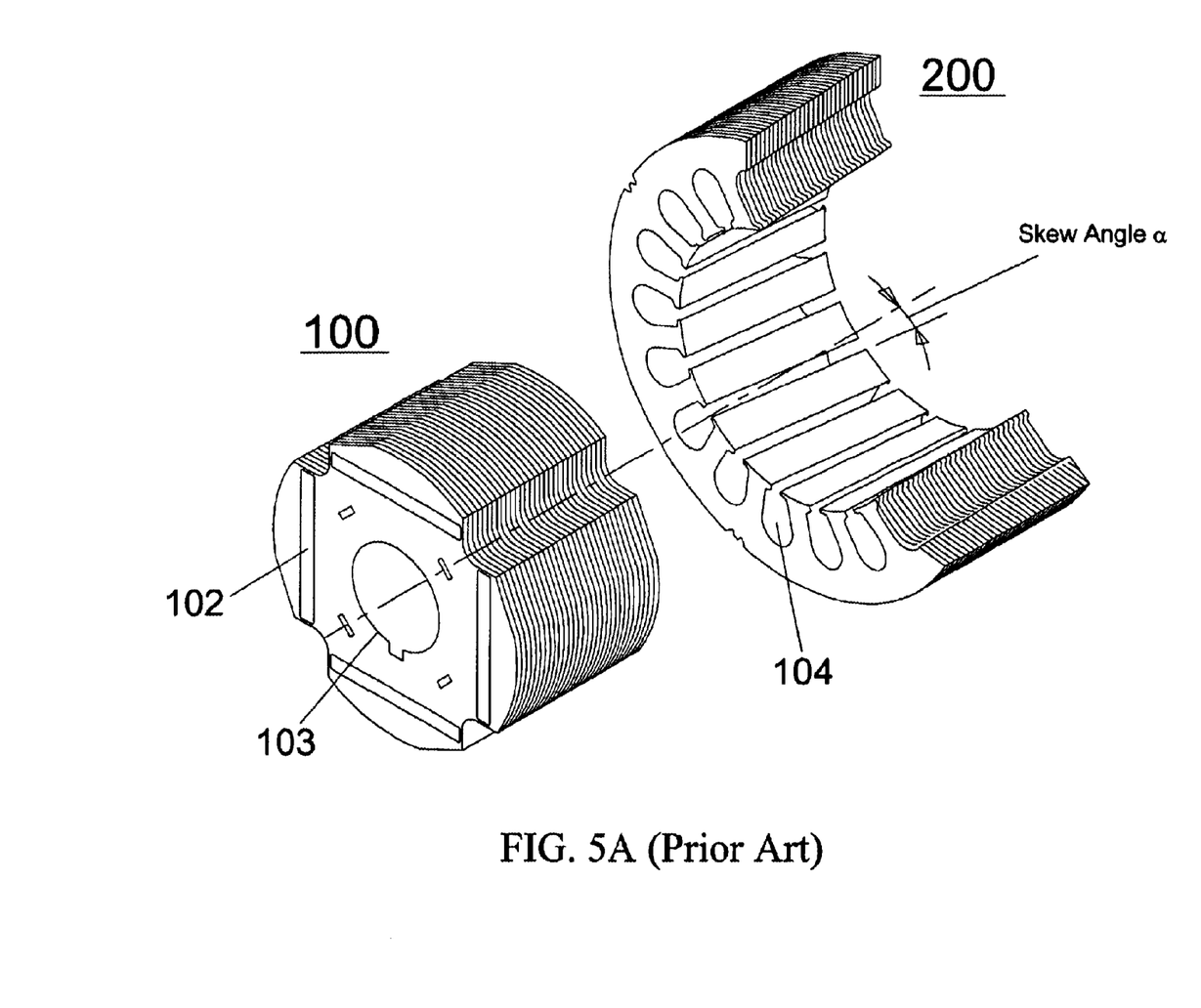
FIG. 5A is an exploded view showing the disposition between the built-in type rotor and the stator of the prior art.
Figure 5B:
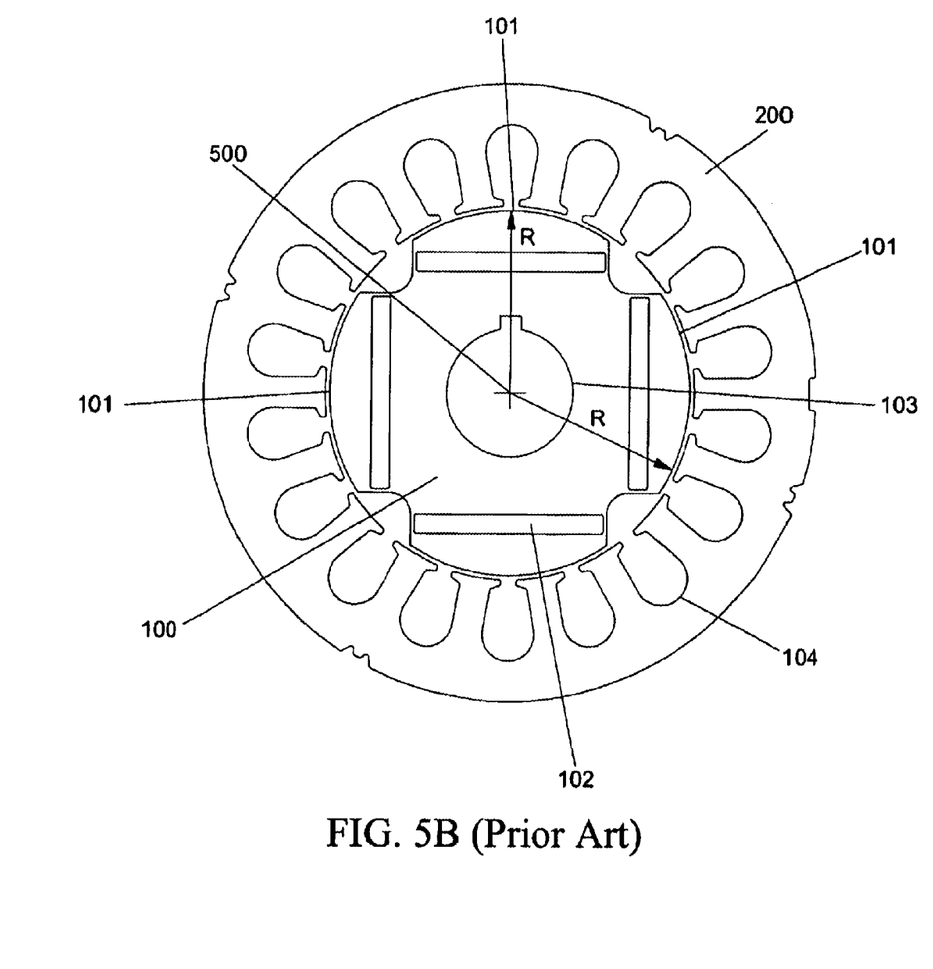
FIG. 5B is an end view showing the disposition between the built-in type rotor and the stator of the prior art.

FIG. 5A is an exploded view showing the disposition between a built-in type rotor and the stator of the prior art while FIG. 5B is an end view showing the disposition between the built-in type rotor and the stator of the prior art. As shown in FIG. 5A and FIG. 5B, the rotor (100) includes a shaft hole (103) for shaft assembly and a multiplicity of axial magnet slots (102) for containing permanent magnets (not shown in the Figure). In order to reduce the cogging torque, the conventional motor employs in its stator (200) a plurality of skew slot structures (104) with a skew angle α, or in accompaniment with the number of stator's slots, employs a polar plane developed in an angle having a non-integer slot number. But the former makes the winding work of the motor hard to implement, and the cost is high and the magnetic flux distribution of the air-gap is not easy to control. While the latter makes the developed angle of the polar plane relatively small, which directly reduces the output of the motor, thereby, is not apt to apply in stator having relatively low number of slots.

Figure 6:
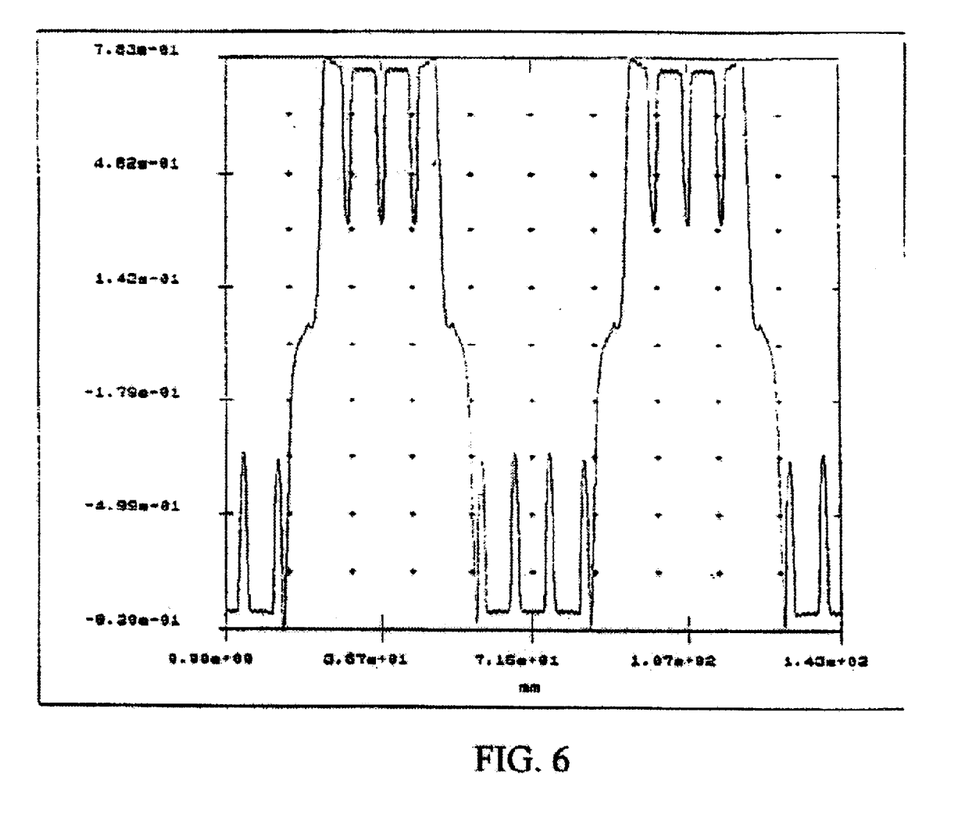
FIG. 6 is a diagram of magnetic flux distribution of the air-gap of the FIG. 5 of the prior art.

FIG. 6 is a diagram of magnetic flux distribution of the air-gap of FIG. 5A and FIG. 5B of the prior art. As shown in FIG. 6, the magnetic flux distribution of the air-gap is a trapezoidal distribution which can result in a relatively large cogging torque.

Therefore, the disadvantages of the prior art can be listed as follows:
(a) The cogging torque of the motor is relatively large.
(b) The developed angle of the polar plane of the permanent magnet is relatively small.
(c) The permanent magnet is apt to generate magnetic flux leakage.
(d) Skew slots that create difficulty in winding work of the stator of the motor is needed in order to reduce the cogging torque.

SUMMARY OF THE INVENTION

In light of the disadvantages of the prior art, the invention provides a rotor structure that can reduce the cogging torque, weaken the armature reaction, as well as prevent the magnetic flux leakage.

Therefore, it is an objective of the invention to provide a circular outer edge of rotor structure for a motor having built-in type permanent magnet that employs a petal-shaped circular pole-plane that is eccentric from the center of the rotor. This rotor structure of the invention can modify the trapezoidal magnetic flux distribution of the air-gap into a approximately-sinusoidal distribution that can improve the shortcoming of being excessive cogging torque of the rotor and simplify the winding work of the motor. The implementation of the invention is nothing to do with the slot number of the stator. The outer edge of the petal-shaped circular arc contour also provides a relatively large resistance to the armature reaction. In addition, due to the precise servo control, the current of the motor is a sinusoidal current. The fact that the magnetic flux of the air-gap of the invention is a approximately-sinusoidal distribution can obtain an uniform output torque, and is quite adequate for the application in precision servo control.

Another objective of the invention is to provide axial empty slots positioned between the shaft hole and the corners where the adjacent magnet slots meet. These axial empty slots can not only prevent the permanent magnet between poles from magnetic leaking but can also directly reduce the rotational inertia of the rotor of the motor. In the meantime, the axial empty slots can directly reduce the rotational inertia of the rotor, shorten the starting time, and reduce the no-load current of the motor.

To achieve the above-mentioned objectives, the invention provides a rotor structure for a motor having built-in type permanent magnet. The rotor includes a shaft hole for installing a shaft, and a multiplicity of axial magnet slots for containing permanent magnet. The invention essentially forms a petal-shaped convex polar portion having an exterior circular arc on the outer edge of the axial magnet slot where the radius of the circular arc is smaller than the radius of the rotor. The petal-shaped convex polar portion provides an approximately sinusoidal distribution of air-gap magnetic flux that can improve the shortcoming of being too large in cogging torque of the motor, weaken the armature reaction of the motor, and prevent the permanent magnet from being demagnetized. In addition, an axial empty slot is also provided between the shaft hole and the corners where the adjacent magnet slots approach such that the magnetic flux leakage can be prevented and the weight of the rotor can be reduced too.

In order to understand fully the objectives, characteristics, and the efficacy of the invention, a detailed illustration with accompanied drawing is described as follows:

DETAILED DESCRIPTION OF THE EMBODIMENTS

Figure 1:
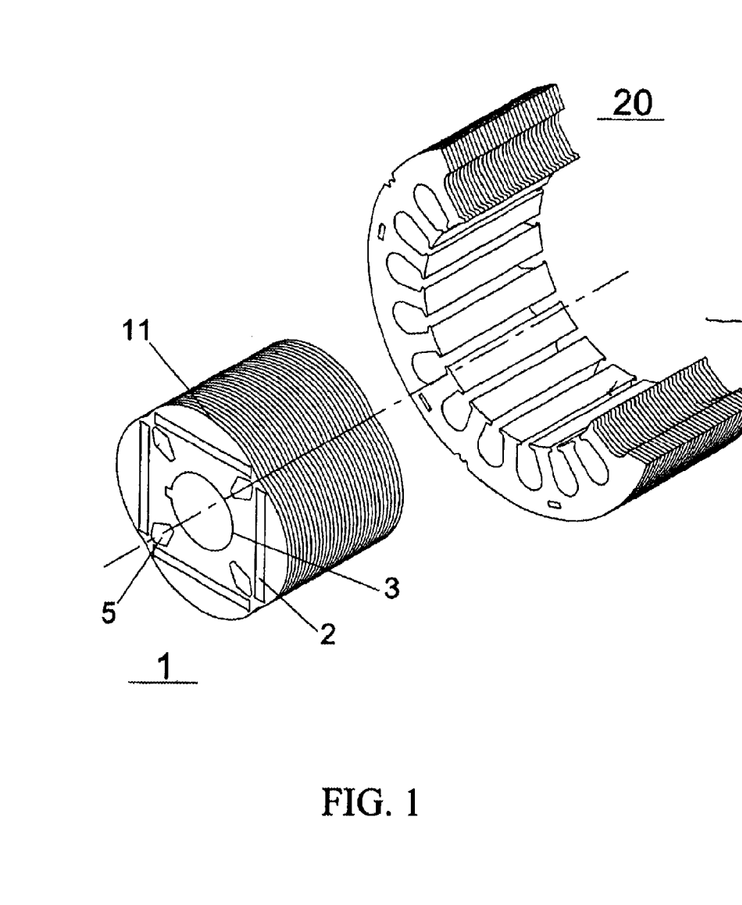
FIG. 1 is an exploded view of the invention.
Figure 2:
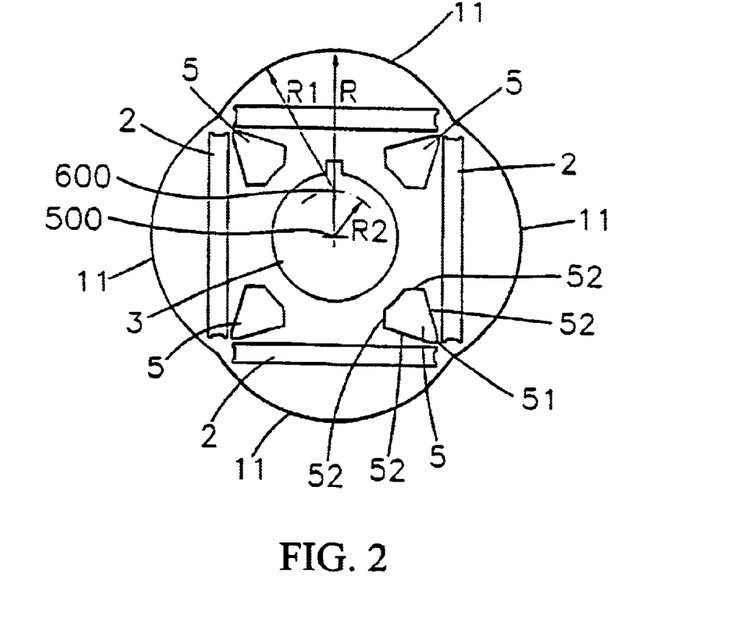
FIG. 2 is an end view of the rotor portion of FIG. 1 of the invention.

FIG. 1 is an exploded view of the invention while FIG. 2 is an end view of the rotor portion of FIG. 1 of the invention. As shown in FIG. 1, the motor includes a rotor (1) and a stator (20). The rotor (1) and the stator (20) are both constituted by a plurality of silicon steel plates having the same configuration. As shown in FIG. 1 and FIG. 2, each piece of silicon steel plate of the rotor (1) includes a multiplicity of axial magnet slots (2) for containing the permanent magnet and a shaft hole (3) for installing shaft assembly. Essentially, the invention provides for each axial magnet slot, the rotor 1 has a petal-shaped convex polar portion (11) having its outer contour formed by constructing a circular arc with a center (600) and a radius R1 as shown in FIG. 2. The center (600) is positioned such that R1 is the difference of a radius R and another radius R2 both having the same center as that of the shaft hole center (500). In this way, a petal-shaped convex polar portion (11) that is formed eccentrically from the rotor's center is provided such that the distribution of the magnetic field in the motor's air-gap is improved. As a result, the flux distribution of the air-gap is close to a sinusoidal distribution such that the disadvantage of being too large in cogging torque can further be improved.

In order to prevent the permanent magnet between the poles from flux leakage, an axial empty slot (5) is provided between the shaft hole (3) and the corners where the adjacent magnet slots (2) approach. The empty slot (5) can reduce directly the rotational inertia of the rotor, the starting time and the no-load current of the motor. Additionally, a sharp vertex is formed in the empty slot (5) at the corner where the adjacent magnet slots (2) approach so that the flux leakage at the side end of the permanent magnet for each pole is reduced. What is more, enlarged slot sides (52) that are on opposite sides of the slot are formed in between the slot vertex and the slot bottom. A flux path that is formed in between each of the two adjacent empty slots must keep a minimum width to avoid saturation of magnetic flux passing through it and to maintain the mechanical strength of shaft installation. Therefore, the empty slot (5) used to prevent the flux leakage of the permanent magnet between the poles has the efficacy of reducing the rotational inertia of the rotor of the motor with might and main. This is under the condition that the mechanical structural strength of the rotor of the motor is not affected and the magnetic flux path of the rotor of the motor is not saturated.

Figure 3:
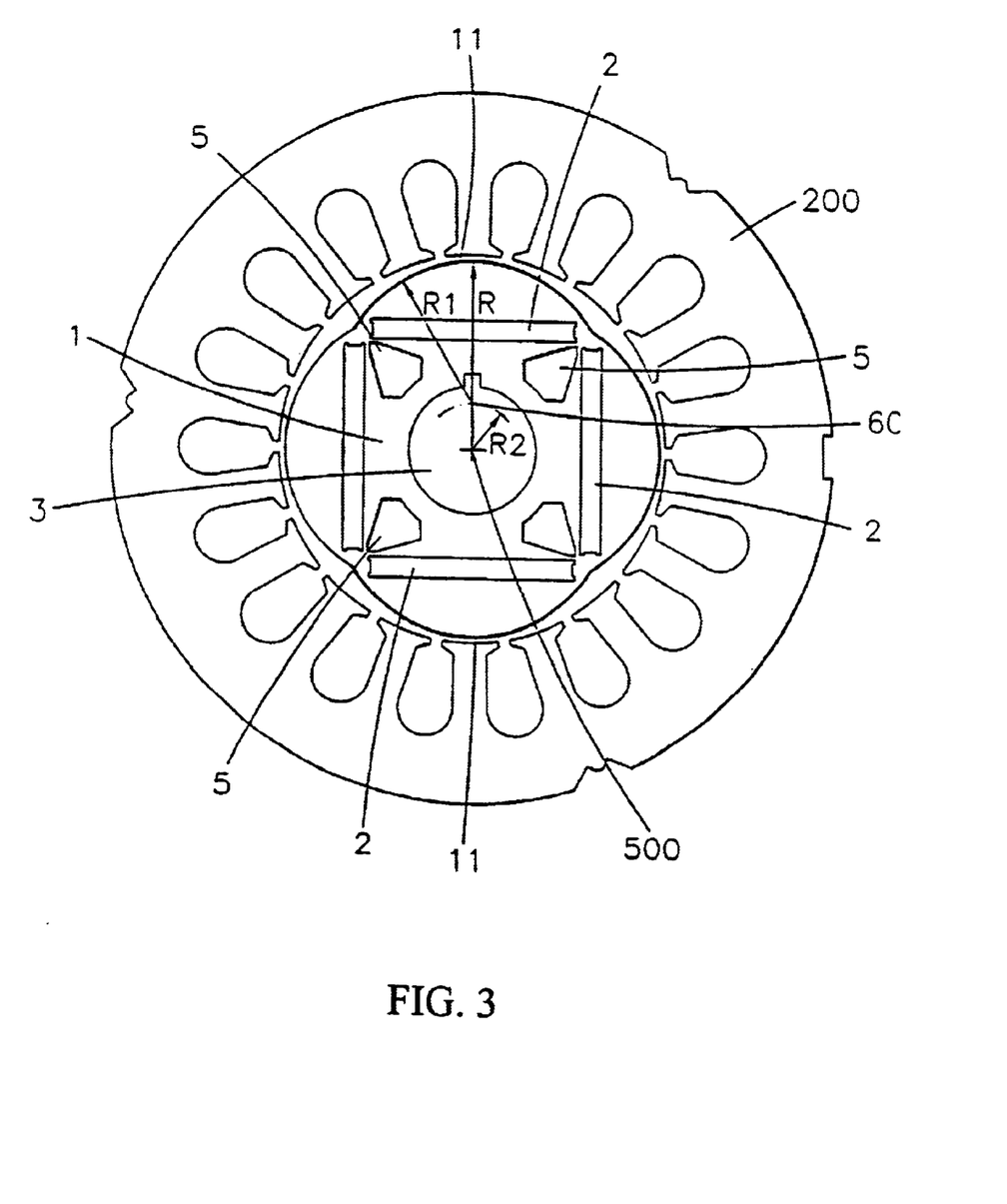
FIG. 3 is an end view of the disposition between the stator and the rotor of the invention.
Figure 4:
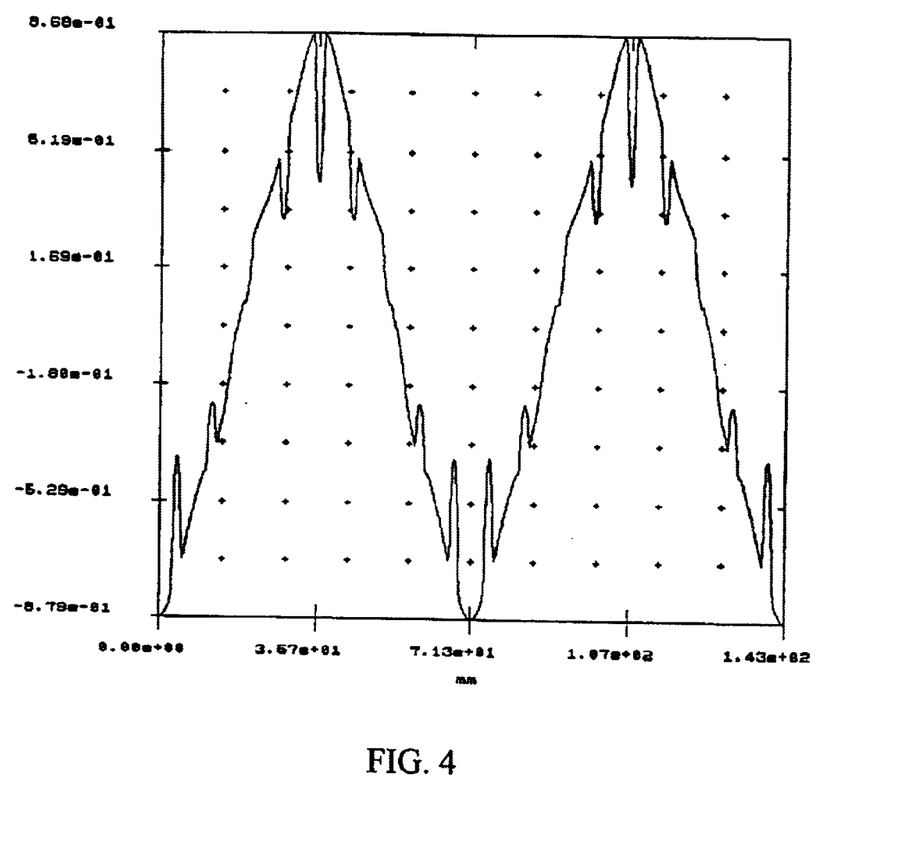
FIG. 4 is a diagram of magnetic flux distribution of the air-gap of the FIG. 3 of the invention.

The above mentioned conclusion of being close to a sinusoidal distribution of the magnetic flux of the air-gap will be further discussed with reference to FIG. 3 and FIG. 4. FIG. 3 is an end view of the disposition between the stator (200) and the rotor (100) of the invention while FIG. 4 shows a diagram of magnetic flux distribution, obtained by using electricity for excitation, of the air-gap of the FIG. 3 of the invention. Without adhering to the rule that the developed angle of the pole plane of each pole can not be the integer multiple of the tooth-angle of each tooth of the stator, the angle of the pole plane of each pole can be fully developed. In the meantime, the invention is applicable further to a precise servo control of sinusoidal current as well as to a relatively small rotational vibration. Certainly, the outer edge of the petal-shaped convex polar portion (11), which is eccentric from the center of the rotor, is employed by the invention to make the stator of the motor generate a relatively thick air-gap faced by the magnetic field of the armature reaction. The relatively thick air-gap can weaken the magnetic field of the armature reaction, and thereby, provide a relatively better resistance to the armature reaction of the motor.

Figure 7:
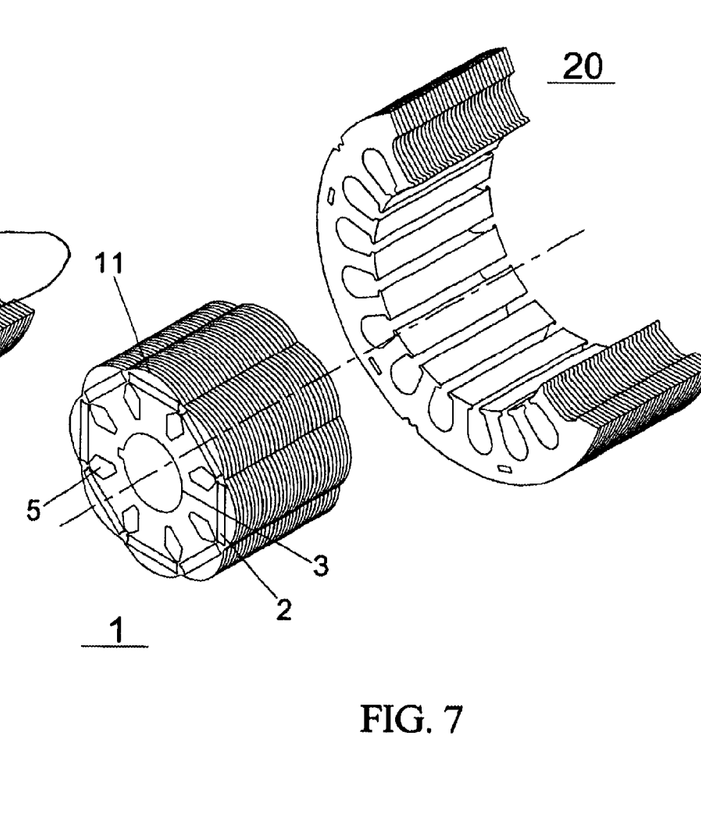
FIG. 7 is an exploded view of the variation of the embodiment shown in FIG. 1 of the invention.
Figure 8:
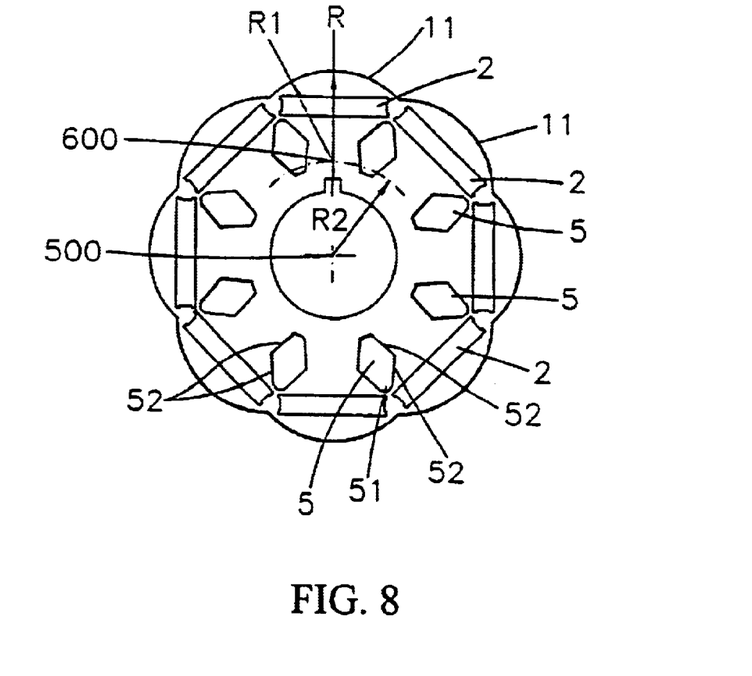
FIG. 8 is an end view of the rotor portion of FIG. 7 of the variation of the embodiment shown in FIG. 2 of the invention.

FIG. 7 is an exploded view of the variation of the embodiment shown in FIG. 1 of the invention while FIG. 8 is an end view of the rotor portion of FIG. 7 of the variation of the embodiment shown in FIG. 2 of the invention. The variation of the embodiment shown in FIG. 7 and FIG. 8 employs the same principle and generating the same effect as that of the embodiment shown in FIG. 1 and FIG. 2. The center of the petal-shaped outer circular arc (11) also forms a R2 difference with the center (500) of the rotor, and the radius R1 of the circular arc is also smaller than the radius R, having a relationship of R1=R−R2, of the rotor. Additionally, a sharp vertex (51) is also formed in the axial empty slot (5). Besides, enlarged slot sides (52) that are on opposite sides of the slot are also formed in between the slot vertex and the slot bottom. The resulting effects are consistent since the principles are the same.

A table comparing the characteristics and efficacy of the rotor structure of the motor between the invention and the prior art is shown as follows:

| Technical and structural characteristics | The invention | The prior art | Comparison in efficacy and its reason |
|---|---|---|---|
| Cogging torque | small | large | The flux distribution of the air-gap of the motor's rotor of the prior art is typically a trapezoidal distribution while the invention is improved into an approximately-sinusoidal distribution |
| Shape of polar plane of each pole | Petal-shaped arc outer edge eccentric from the center of the rotor | Concentric circular outer edge | The invention can modify the motor's air-gap flux distribution to become an approximately sinusoidal distribution |
| Developed angle of polar plane of each pole | Fully developed | Can not be fully developed | The developed angle of the pole plane of each pole can not be the integer multiple of the teeth angle of each tooth of the stator according to the prior art. The invention needs not follow the rule. |
| Silicon steel plate of the of stator | Skew slot is not needed | Skew slot is needed | That the motor's stator of the invention does not need to employ the skew slot structure makes the motor's winding work simple and facilitates automation in manufacturing. |
| Resistance to motor's armature reaction | Good | Bad | The invention employs the outer edge of the petal-shaped convex polar portion, which is eccentric from the center of the rotor, to make the motor's stator generate a relatively wide air-gap faced by the magnetic field of the armature reaction, thereby, the invention does not need a relatively thick permanent magnet. |
| Flux leakage reducing mechanism of the permanent magnet between poles | Employ a special axial empty slot to prevent the permanent magnet between poles from magnetic flux leaking | Employ a side rib in the magnet containing slot | The axial empty slot for preventing the permanent magnet between poles from magnetic flux leaking possesses also the efficacy of reducing the rotational inertia of the rotor of the motor |
| Feasibility and efficacy | High | Low | Since the motor of the prior art needs to associate with a |

-continued

| Technical and structural characteristics | The invention | The prior art | Comparison in efficacy and its reason |
|---|---|---|---|
| when applied in sinusoidal current control | | | skew slot of the stator, the cost of winding work is relatively high and the contour of the air-gap magnetic flux distribution is hard to control; while the invention employs a petal-shaped convex portion having outer edge with circular arc that, by adjusting its amount of eccentricity and the radius of the circular arc, can obtain an approximately sinusoidal flux distribution |
| Operational vibration | Small | Large | The air-gap magnetic flux distribution is close to a sinusoidal distribution while that of the prior art is a trapezoidal distribution |

The fact that the invention does not need a skew slot structure of the stator makes the winding work of motor easy to implement. Moreover, since the accuracy of the petal-shaped convex polar portion is easy to control, the manufacturing of the motor can be simplified and automation is facilitated. In addition, the approximately-sinusoidal distribution of air-gap magnetic flux effectively improves the shortcoming of excessive cogging torque. In the mean time, the implementation of the invention can make the angle of pole plane fully develop and is applicable to the precision servo control of the sinusoidal current. Therefore, the invention is applicable to the motor having relatively small vibration, and is nothing to do with the slot number of the stator. What is more, there is a relatively thick air-gap faced by the magnetic field of the armature reaction of the motor. Besides, the axial empty slots provided between the shaft hole and the corners where the adjacent magnet slots meet not only can prevent the permanent magnet between poles from magnetic leaking but also can directly reduce the rotational inertia of the rotor of the motor. Therefore, the invention is a progressive motor with novel structure and significant efficacy.

While the invention has been described by way of examples and in terms of a preferred embodiment, it is to be understood that the invention is not limited to the disclose embodiment. On the contrary, it is intended to cover various modifications. Therefore, the scope of the appended claims should be accorded the broadest interpretation so as to encompass all such modifications.

What is claimed is:

1. A rotor structure for a motor having built-in type permanent magnets comprising:
   a plurality of axial magnet slots for containing permanent magnets;
   a plurality of petal-shaped convex polar portions, each being disposed adjacent a corresponding one of the magnet slots and having an exterior circular arc on an outer side of the corresponding magnet slot;
   a shaft hole for installing a shaft; and
   a plurality of axial empty slots, each axial empty slot being provided between the shaft hole and a corner where a pair of adjacent magnet slots approach and having a sharp slot vertex formed at the corner where the pair of adjacent magnet slots approach, each axial empty slot additionally having extended slot sides formed on opposite sides of the slot in between the slot vertex and a slot bottom,
   wherein the center of the petal-shaped convex polar portion the center of the exterior circular arc and the center of the rotor are spaced apart by a position difference R2 such that the radius R1 of the exterior circular arc is smaller than the radius R of the rotor in accordance with the relation R1+R2=R, and the circular arc is eccentric from the center of the rotor.

2. The rotor structure for a motor having built-in type permanent magnets of claim 1, wherein the empty slots are located generally inward of the axial magnet slots.

3. A rotor structure for a motor, comprising:
   a laminated body having a pair of end faces and an axis that runs through the end faces, the body additionally having a shaft hole that follows the axis and that receives a rotor shaft, the body also having slots that receive permanent magnets, the body further having an outer periphery that extends between the end faces,
   wherein the outer periphery of the body comprises a plurality of petal-shaped convex portions that are configured substantially as arcs of circles having centers that are located approximately a common distance R2 from the axis of the body,
   wherein the arcs of the outer periphery have arc summits that are located approximately a common distance R from the axis of the rotor, R being greater than R2,
   wherein the circles that provide the arcs have a common radius R1,
   wherein R is substantially equal to the sum of R1 and R2,
   wherein the outer periphery of the body has four arcs,
   wherein R2 is about a third of R1, and
   wherein the rotor has a generally squarish appearance with rounded corners when viewed in a direction normal to one of the end faces.

4. The rotor structure of claim 3, wherein the centers of the circles that provide the arcs lie substantially along straight lines extending between the axis of the body and the arc summits.

5. A rotor structure for a motor, comprising:
   a laminated body having a pair of end faces and an axis that run through the end faces, the body additionally having a shaft hole that follows the axis and that receives a rotor shall, the body also having slots that receive permanent magnets, the body further having an outer periphery that extends between the end faces,
   wherein the outer periphery of the body comprises a plurality of petal-shaped convex portions that are configured substantially as arcs of circles having centers that are located approximately a common distance R2 from the axis of the body,
   wherein the arcs of the outer periphery have arc summits that are located approximately a common distance R from the axis of the rotor, R being greater than R2,
   wherein the circles that provide the arcs have a common radius R1,
   wherein R is substantially equal to the sum of R1 and R2, and
   wherein the outer periphery of the body has eight arcs, and
   wherein R2 is about equal to R1.

6. The rotor structure of claim 5, wherein the centers of the circles that provide the arcs lie substantially along straight lines extending between the axis of the body and the arc summits.

7. A rotor structure for a motor, comprising;
a laminated body having a pair of end faces and an axis that runs through the end faces, the body additionally having a shaft hole that follows the axis and that receives a rotor shaft, the body also having slots that receive permanent magnets, the body further having an outer periphery that extends between the end faces,
wherein the outer periphery of the body comprises a plurality of petal-shaped convex portions that are configured substantially as arcs of circles having centers that are located approximately a common distance $R2$ from the axis of the body,
wherein the arcs of the outer periphery have arc summits that are located approximately a common distance $R$ from the axis of the rotor, $R$ being greater than $R2$,
wherein the circles that provide the arcs have a common radius $R1$,
wherein $R$ is substantially equal to the sum of $R1$ and $R2$,
wherein the outer periphery of the rotor has valleys between the arcs, the distance between the valleys and the axis of the body being smaller than the distance between the arc summits and the axis of the body, and
wherein the body additionally has empty slots that extend generally parallel to the axis of the body, the empty slots being located adjacent to the valleys but inward of the outer periphery of the body, so that the empty slots do not communicate with the outer periphery.

8. The rotor structure of claim 7, wherein the empty slots have generally V-shaped portions, with the points of the V's being directed toward the valleys.

9. The rotor structure of claim 7, wherein the empty slots are located generally inward of the slots that receive permanent magnets.

10. The rotor structure of claim 7, wherein the centers of the circles that provide the arcs lie substantially along straight lines extending between the axis of the body and the arc summits.

* * * * *